Patented Feb. 17, 1931

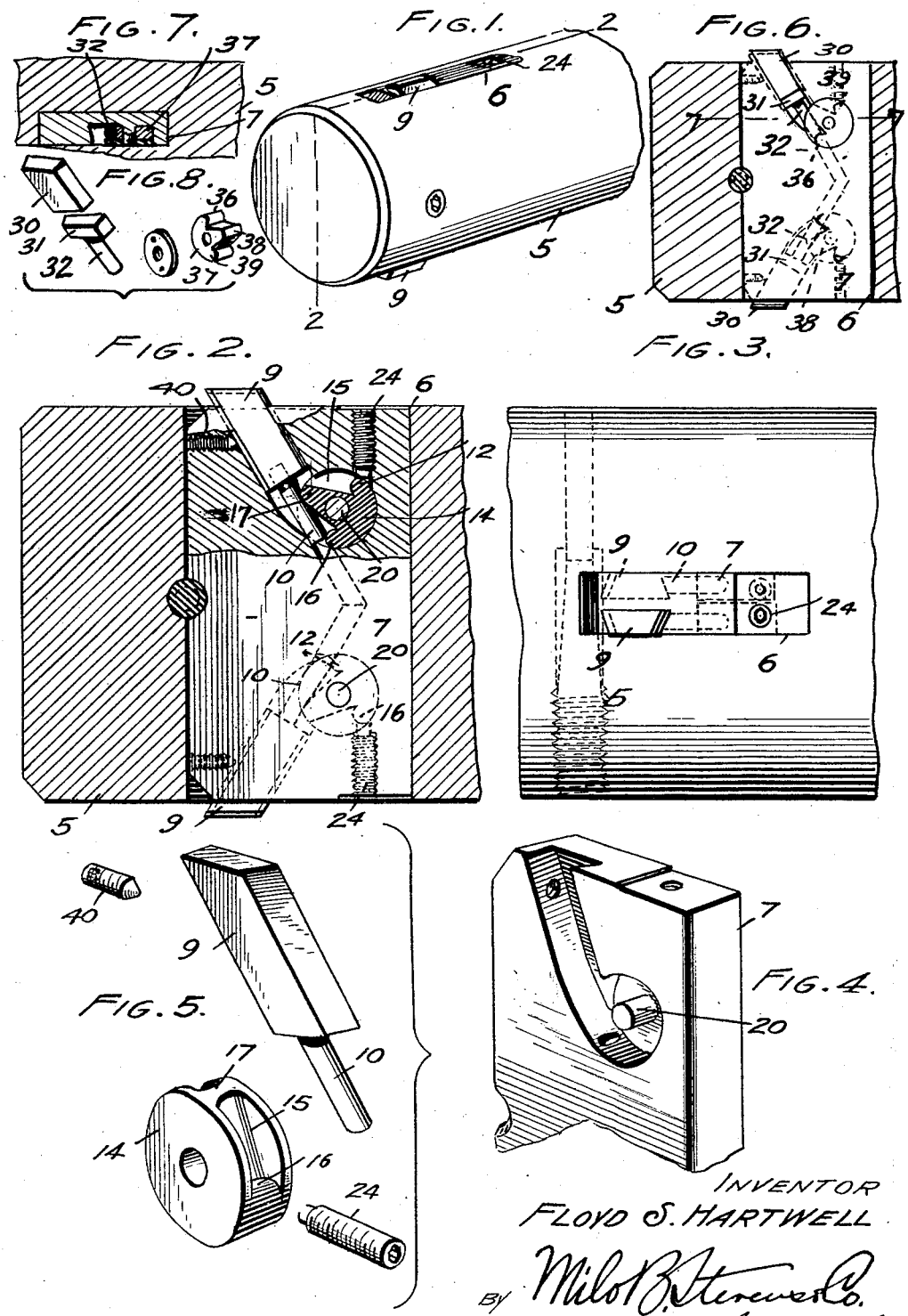

1,792,905

UNITED STATES PATENT OFFICE

FLOYD S. HARTWELL, OF SYRACUSE, NEW YORK

CUTTER HEAD FOR BORING BARS OR THE LIKE

Application filed February 16, 1926. Serial No. 88,677.

This invention relates to rotary cutters and more particularly to a cutter head or block for a boring bar, or the like.

An important object of the invention is to provide a cutter head having novel means whereby the blades or cutters may be adjusted to the desired cutting diameter without removing the head from the boring bar or other support whereby the work is expedited and rendered more accurate.

A further and equally important object of the invention is to provide a cutter head of the character specified which is of highly simplified construction and which may, therefore, be easily assembled and maintained at a low cost.

A further aim of the invention is to provide a cutter head which may be applied to a conventional boring bar without alteration of the boring bar and without a substantial departure from established practices, both of which features make the invention more acceptable to the trade.

Other objects and advantages will be apparent during the course of the following description.

In the accompanying drawings forming a part of this application and in which like numerals are employed to designate like parts throughout the same, Figure 1 is a fragmentary perspective of a boring bar constructed in accordance with the invention;

Figure 2 is a longitudinal sectional view through the forward portion of the bar;

Figure 3 is a fragmentary plan view of a boring bar equipped with the improved cutter head;

Figure 4 is a fragmentary perspective of a blade carrying block embodied in the invention;

Figure 5 is a group perspective of a blade and the adjusting means therefor;

Figure 6 is a side elevation of the improved blade carrying block in position in a boring bar and provided with a slightly different form of blade adjusting means;

Figure 7 is a sectional view taken on line 7—7 of Figure 6;

Figure 8 is a group perspective illustrating a blade and the adjusting mechanism shown in Figures 6 and 7.

In the drawings, the numeral 5 designates a boring bar or other support having the usual transverse slot 6 for the reception of a cutter block or head 7. As shown in the drawings, the forward edge of the block 7 is provided with a substantially semi-circular recess for the reception of a taper screw by means of which the block may be securely locked in the bar. More specifically, the tightening of the taper screw forces the block 7 firmly into engagement with the rear wall of the slot 6 whereby the block will remain in adjustment event while making rough or heavy cuts.

Figure 3 illustrates that opposite sides of the block 7 are provided with under-cut grooves for the reception of cutters 9, the outer ends of which are sharpened in the usual manner for engagement with the work. The cutters 9 may be provided at the inner portions thereof with longitudinal sockets for the reception of stems or pins 10 adapted to be engaged by the lobes 16 of disk-shaped cams 14. Figure 2 plainly illustrates that each cam 14 is provided with a pair of more or less similarly formed recesses 15 defining the lobe 12 and a second lobe 16 and a radial projection or division member 17 is positioned between the recesses 15.

In carrying out the invention, the block 7 is annularly milled at opposite sides thereof to provide annular recesses to snugly receive the cams 14, of which there are two, and when the block is thus annularly milled pivot members or studs 20 are defined in the center of the annular recesses, which studs rotatably support the disk-shaped cams 14. When the disk-shaped cams are rotated in a clockwise direction the lobes 16 of the same are engaged with the rear ends of the stems 10 so as to move the cutters outwardly to the desired positions. However, the outward movement of the cutters 9 is limited to the depth of the recesses 15 so that the cutters may not be moved outwardly to a point where they would not have sufficient bearing in the slots. This, of course, would weaken the connection between the cutters and the block.

The cams 14 are actuated by adjusting screws 24 threaded into opposite edges of the block and having sockets for the reception of a suitable tool, one of which tools is known on the market as the Allen adjusting wrench. However, any tool desired may be employed. The inner end of each adjusting screw 24 is somewhat reduced and is adapted to engage the adjacent cam 12 so that when the adjusting screw is advanced by the operator the cam will be turned and the cutter will be moved outwardly. Attention is directed to the fact that the stems 10 hold the cams 14 against accidental removal from the studs 20 as the stems are positioned between the opposed sides of the slots 15. It is also to be noted from Figure 2 that the division member 17 of each cam 14 engages its adjacent stem 10 and adjusting screw 24 to so limit movement of the cam as to maintain lobe 16 in the path of stem 10.

In the form of invention illustrated in Figures 6, 7 and 8, the cutter 30 may be of conventional design or substantially so and is engaged by the head 31 of an adjusting stem 32, the adjusting stem and the head in this case being constructed separately from the cutter 30. There is no permanent connection between the head 31 and the cutter 30 as the head 31 merely bears against the rear end of the cutter. The head 31 may be beveled at its sides to conform to the cross-sectional outline of the cutter 30 whereby the head 31 freely moves in the slot in which the cutter 30 operates. In this case the rear end of the stem is engaged by the lobe 36 of a cam designated by the numeral 37, which cam is mounted upon the centrally arranged stud 20. A radial member 38 is formed on the cam 37 between the lobe 36 and the lobe 39. The lobe 39 is, of course, engaged by an adjusting screw so as to turn the cam 37 and thereby move the cutter 30 outwardly to the desired point.

With reference to the foregoing description taken in connection with the accompanying drawings it will be apparent that the operator may adjust the cutters separately from the exterior of the bar and without removing the block from the bar simply by engaging a suitable tool with the adjusting screws 24 and advancing them to the desired points. When the cutters have been moved outwardly to the desired cutting diameter they may be locked in place by means of set screws 40, the forward ends of which may be tapered for engagement with the cutters.

The foregoing illustrates that the invention forming the subject matter of this application is capable of a wide variety of mechanical expressions and it is, therefore, to be understood that the forms of the invention herewith shown and described are to be taken merely as preferred examples of the same and that such minor changes in arrangement and construction of parts may be made as will remain within the spirit of the invention and the scope of what is claimed.

Having thus described the invention, what is claimed is:

1. In a cutting tool having a guideway, an adjustable bit in said guideway and held therein for movement in a single plane, a rotatable cam having a pair of radially spaced lobes, one of said lobes engaging said bit, adjustable means engaging the other lobe for swinging said cam to actuate said bit, and a projection carried by said cam intermediate said lobes and engageable with the side of said bit and the adjustable means for limiting movement of the cam to maintain the first mentioned lobe in a position to engage said bit.

2. A tool of the character specified comprising a block adapted to be received in the slot of a boring bar, said block having a surface recess opening at one side, a cutter in said recess and adjustable in the direction of the length of the recess, the recess serving as a guide for the cutter, an actuating member engaged with said cutter, said recess having a lateral circular enlargement at its inner end, a disk-shaped cam rotatable in said recess enlargement, said cam having a peripherial recess defining two radially spaced laterally projecting lobes, one of the lobes being adapted to engage said actuating member to move the cutter outwardly, and an adjusting screw adapted to engage with the other lobe for turning the cam, said adjusting screw being accessible from the exterior of the bar without removing the block from the slot and the adjacent slot wall serving to hold said cam, cutter and actuating member in said recess.

3. A cutter block for boring bars comprising a body having a cutter-confining guideway and an annular surface recess communicating with said guideway, a cutter held in said guideway for movement in a single plane, a stem carried by said cutter, a cam of disk shaped formation received in said annular recess and having a lobe engageable with said stem for advancing said cutter, means for turning said cam, radial flanges carried by said cam and engaging said stem to prevent axial movement of the cam and hold the same in said recess, and a projection carried by said cam between said flanges and adapted to engage the side of said cutter stem for limiting movement of the cam in one direction to maintain the stem-engaging lobe in the path of the stem.

4. A cutter block for boring bars comprising a body having a cutter-confining guideway and an annular surface recess communicating with said guideway, a cutter held in said guideway for movement in a single plane, a stem carried by said cutter, a cam of disk shaped formation received in said annular recess and having a lobe engageable with said stem for advancing said cutter, means for turning said cam, radial flanges carried by said cam and engaging said stem to prevent axial movement of the cam and hold the same in said recess, and a projection carried by said cam between the plane of said flanges and adapted to engage said turning means and the side of said stem to limit turning movement of the cam in both directions to maintain the stem-engaging lobe in the path of the stem.

In testimony whereof I affix my signature.

FLOYD S. HARTWELL.